(12) United States Patent
Liang et al.

(10) Patent No.: US 8,811,022 B2
(45) Date of Patent: Aug. 19, 2014

(54) ELECTRONIC DEVICE WITH GUIDING MECHANISM FOR GUIDING FLEXIBLE PRINTED CIRCUIT BOARD

(75) Inventors: Chen-Yi Liang, New Taipei (TW); Cheng-Hsiang Chuang, New Taipei (TW); Chun-Chien Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 211 days.

(21) Appl. No.: 13/591,230

(22) Filed: Aug. 22, 2012

(65) Prior Publication Data

US 2013/0128475 A1 May 23, 2013

(30) Foreign Application Priority Data

Nov. 18, 2011 (TW) .............................. 100142424 A

(51) Int. Cl.
*H05K 7/00* (2006.01)
*H05K 7/16* (2006.01)
*H04M 1/02* (2006.01)
*H04M 1/00* (2006.01)

(52) U.S. Cl.
CPC .......... *H04M 1/0235* (2013.01); *H04M 1/0214* (2013.01); *H04M 1/0277* (2013.01); *Y10S 345/905* (2013.01)
USPC ................. 361/749; 361/679.01; 361/679.06; 361/679.21; 361/679.27; 361/679.39; 361/727; 455/575.1; 455/575.2; 455/575.3; 345/157; 345/168; 345/169; 345/905

(58) Field of Classification Search
USPC ................. 361/679, 679.01, 679.06, 679.02, 361/679.09, 679.21, 679.27, 679.3, 679.39, 361/679.55, 679.56, 724–727, 749; 455/575.1, 575.2, 575.3, 575.4, 575.8, 455/90.2, 90.3; 345/156, 157, 167, 168, 345/169, 905; 312/223.2, 223.3, 236
See application file for complete search history.

(56) References Cited

U.S. PATENT DOCUMENTS

| 7,532,169 B2 * | 5/2009 | Joo et al. ........................ 343/702 |
| 7,596,396 B2 * | 9/2009 | Fagrenius et al. .......... 455/575.4 |
| 7,996,052 B2 * | 8/2011 | Shih et al. .................. 455/575.4 |

(Continued)

FOREIGN PATENT DOCUMENTS

TW  201029544  8/2010

OTHER PUBLICATIONS

Office action mailed on Oct. 11, 2013 for the Taiwan application No. 100142424, filing date: Nov. 18, 2011, p. 1 line 13~14, p. 2 and p. 3 line 1~18.

*Primary Examiner* — Michail V Datskovskiy
(74) *Attorney, Agent, or Firm* — Winston Hsu; Scott Margo

(57) ABSTRACT

An electronic device with a guiding mechanism for guiding a flexible printed circuit board includes a base, a cover, two guiding members, a pushing member, the flexible printed circuit board (FPC) and a rotating member. A through hole is formed on the base. The cover is movably disposed on a first side of the base. The two guiding members are disposed on the second side of the base in parallel. The pushing member is slidably disposed on the two guiding members and has a guiding surface. An end of the FPC is connected to the cover and an other end of the FPC passes through the through hole and surrounds the guiding surface of the pushing member so as to be connected to the base. The rotating member is rotatably disposed on the second side of the base and has a pushing portion abutting against the pushing member.

18 Claims, 18 Drawing Sheets

(56) References Cited

U.S. PATENT DOCUMENTS

| | | | |
|---|---|---|---|
| 7,997,911 B2* | 8/2011 | Wang et al. | 439/131 |
| 8,010,169 B2* | 8/2011 | Chuang et al. | 455/575.1 |
| 8,335,078 B2* | 12/2012 | Lee et al. | 361/679.56 |
| 8,379,396 B2* | 2/2013 | Huang et al. | 361/749 |
| 8,451,602 B2* | 5/2013 | Huang et al. | 361/679.56 |
| 8,634,885 B2* | 1/2014 | Chang et al. | 455/575.4 |
| 2008/0174942 A1* | 7/2008 | Yang et al. | 361/680 |
| 2008/0298025 A1* | 12/2008 | Chang et al. | 361/727 |
| 2009/0027841 A1* | 1/2009 | Shih et al. | 361/680 |
| 2009/0247247 A1* | 10/2009 | Jang | 455/575.4 |
| 2010/0144409 A1* | 6/2010 | Huang et al. | 455/575.4 |
| 2012/0154999 A1* | 6/2012 | Park | 361/679.01 |
| 2013/0255995 A1* | 10/2013 | Mai et al. | 174/136 |

\* cited by examiner

ELECTRONIC DEVICE WITH GUIDING MECHANISM FOR GUIDING FLEXIBLE PRINTED CIRCUIT BOARD

BACKGROUND OF THE INVENTION

1. Field of the Invention

The invention relates to an electronic device and, more particularly, to an electronic device with a guiding mechanism for guiding a flexible printed circuit board.

2. Description of the Prior Art

Flexible printed circuit board (FPC) can be applied to various electronic devices due to its flexibility. Therefore, FPC is a necessary component while electronic devices tend to light, thin, short, small and multi-function design. So far lots of sliding-type electronic devices have been developed, such as sliding-type flat computer, sliding-type mobile phone and so on. The sliding-type electronic device utilizes an FPC to connect a display device, which can move with respect to a base, and a main circuit board, which disposed in the base. When the display device moves with respect to the base, the display device will drives the FPC to move. After a user opens or closes the display device with respect to the base again and again, the FPC may crack due to compression.

SUMMARY OF THE INVENTION

The invention provides an electronic device with a guiding mechanism for guiding a flexible printed circuit board so as to solve the aforesaid problems.

According to an embodiment of the invention, an electronic device comprises a base, a cover, two guiding members, a pushing member, a flexible printed circuit board (FPC) and a rotating member. A through hole is formed on the base. The base has a first side and a second side opposite to the first side. The cover is movably disposed on the first side of the base. The two guiding members are disposed on the second side of the base in parallel. The through hole is between the two guiding members. The pushing member is slidably disposed on the two guiding members and has a guiding surface. An end of the flexible printed circuit board is connected to the cover and an other end of the flexible printed circuit board passes through the through hole and surrounds the guiding surface of the pushing member so as to be connected to the base. The rotating member is rotatably disposed on the second side of the base and has a pushing portion abutting against the pushing member.

When the cover moves with respect to the base from a close position to an open position, the rotating member rotates with respect to the base such that the pushing portion pushes the pushing member to slide along the two guiding members so as to drive the flexible printed circuit board to move. When the cover moves with respect to the base from the open position to the close position, the flexible printed circuit board drives the pushing member to slide along the two guiding members so as to drive the rotating member to rotate. Furthermore, when the cover rotates with respect to the base from the open position to an inclined position, the flexible printed circuit board drives the pushing member to slide along the two guiding members so as to drive the rotating member to rotate. When the cover rotates with respect to the base from the inclined position to the open position, the rotating member rotates with respect to the base such that the pushing portion pushes the pushing member to slide along the two guiding members so as to drive the flexible printed circuit board to move.

As mentioned in the above, when the cover moves with respect to the base between the close position and the open position or rotates with respect to the base between the open position and the inclined position, the invention utilizes a guiding mechanism, which essentially consists of the guiding members, the pushing member and the rotating member, to guide the FPC to move along a direction defined by the guiding members. Accordingly, the invention can prevent the FPC from cracking effectively while the FPC moves or rotates again and again.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
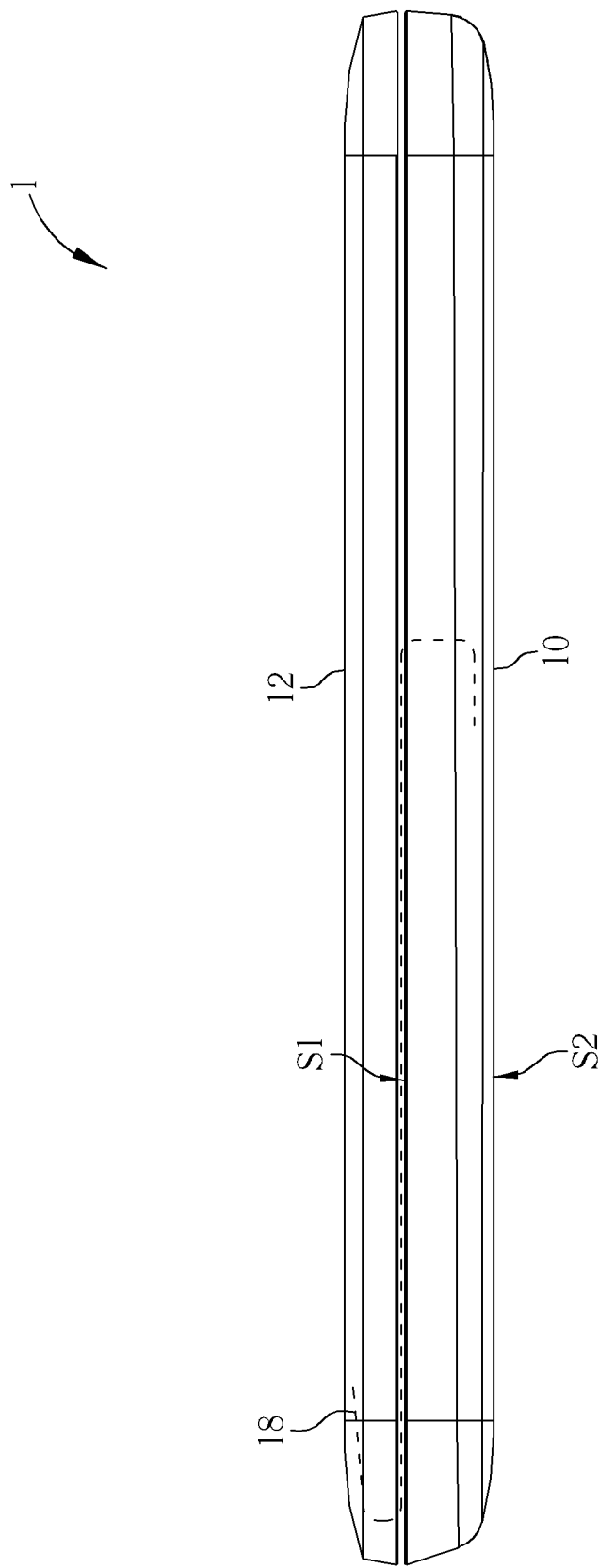
FIG. 1 is a side view illustrating an electronic device with a guiding mechanism for guiding a flexible printed circuit board according to a first embodiment of the invention, wherein the cover is located at a close position with respect to the base.
Figure 2:
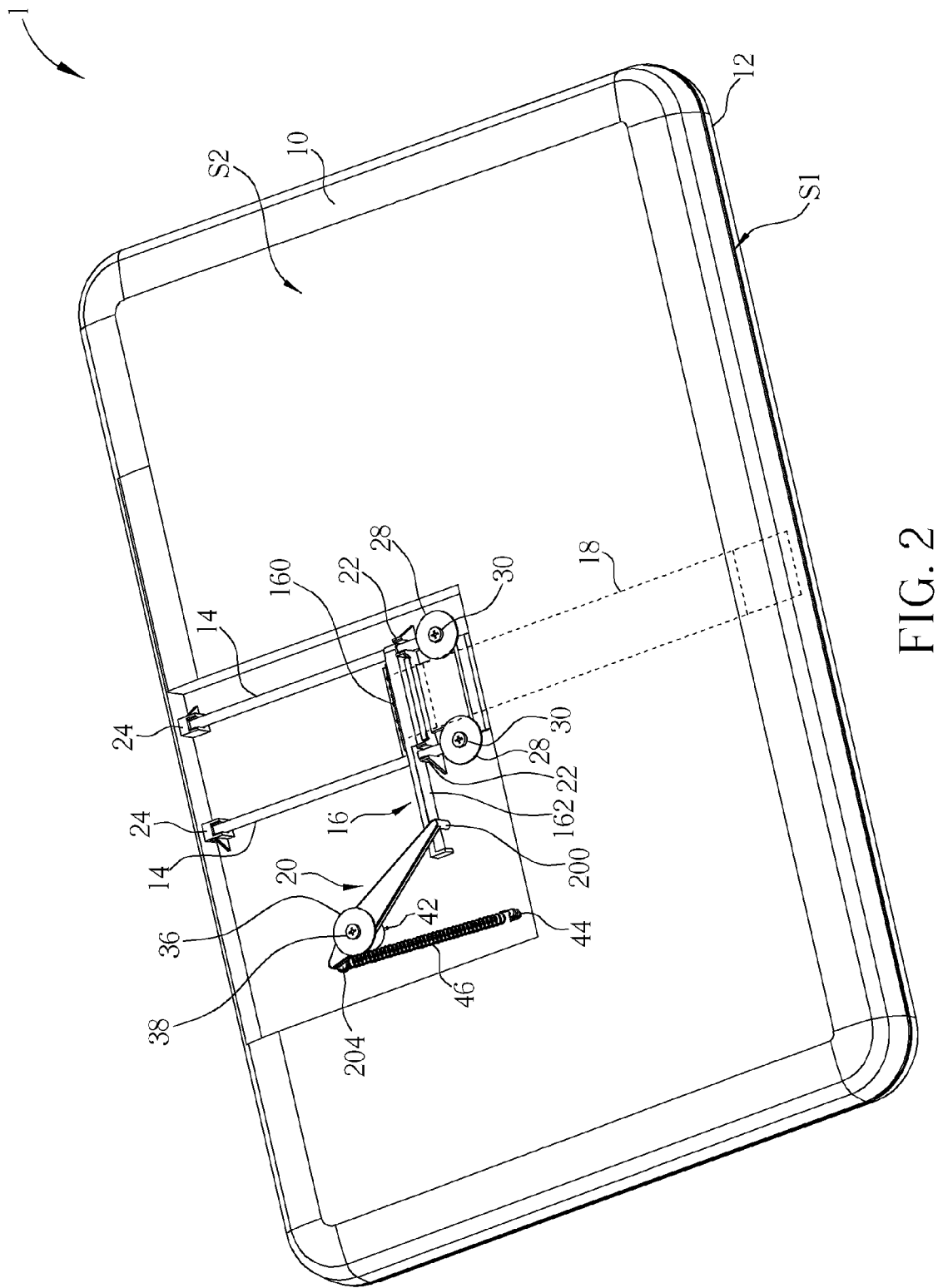
FIG. 2 is a rear perspective view illustrating the electronic device shown in FIG. 1.
Figure 3:
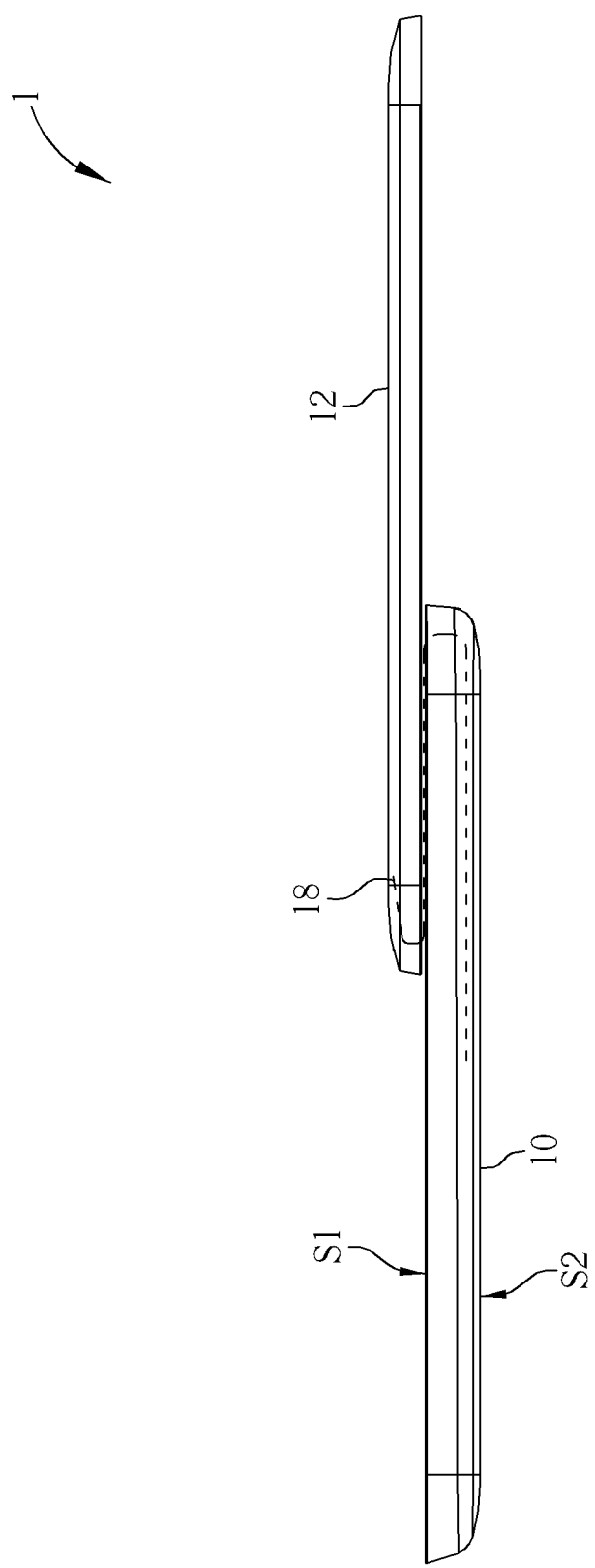
FIG. 3 is a side view illustrating the cover located at an open position with respect to the base shown in FIG. 1.
Figure 4:
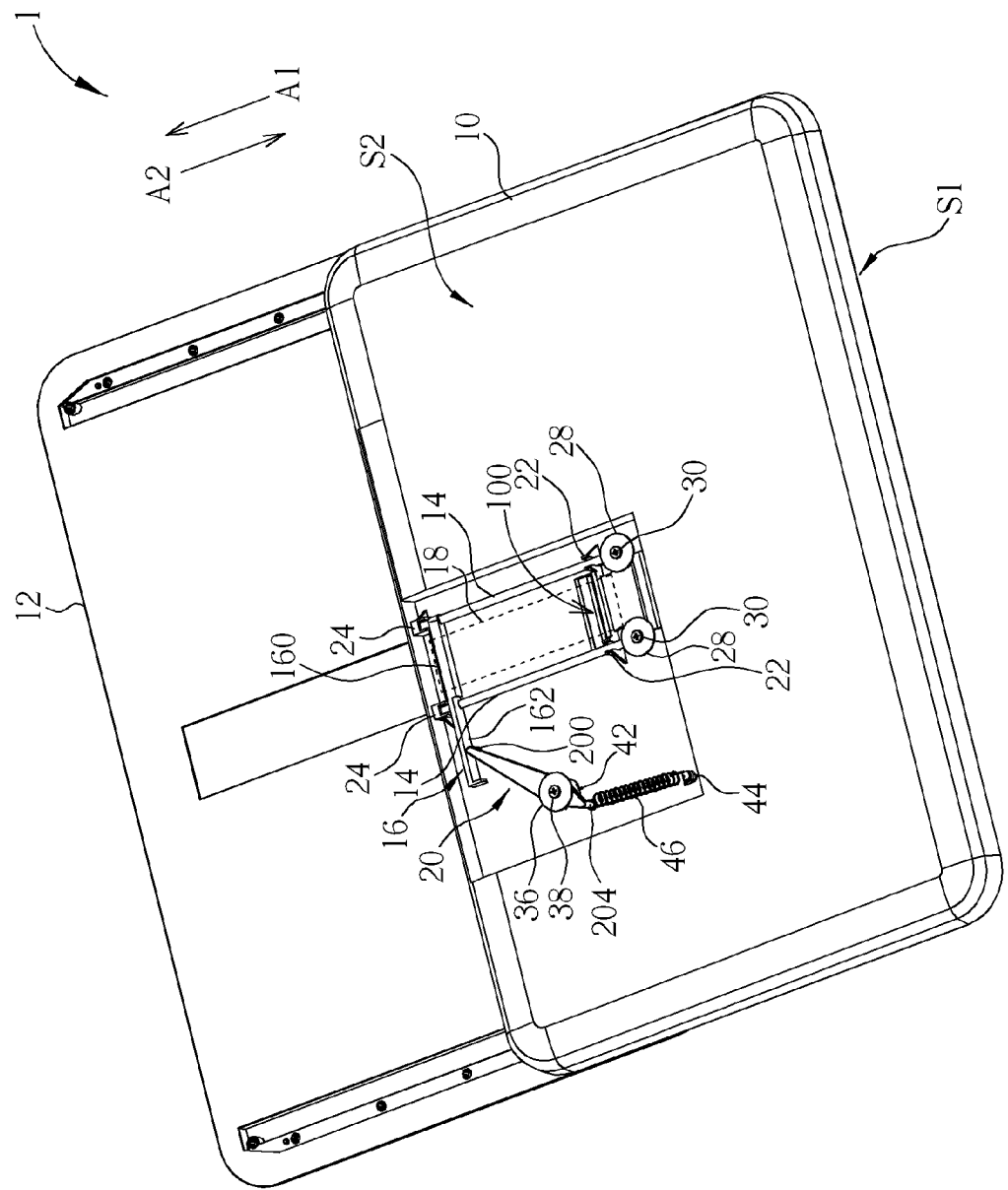
FIG. 4 is a rear perspective view illustrating the electronic device shown in FIG. 3.
Figure 5:
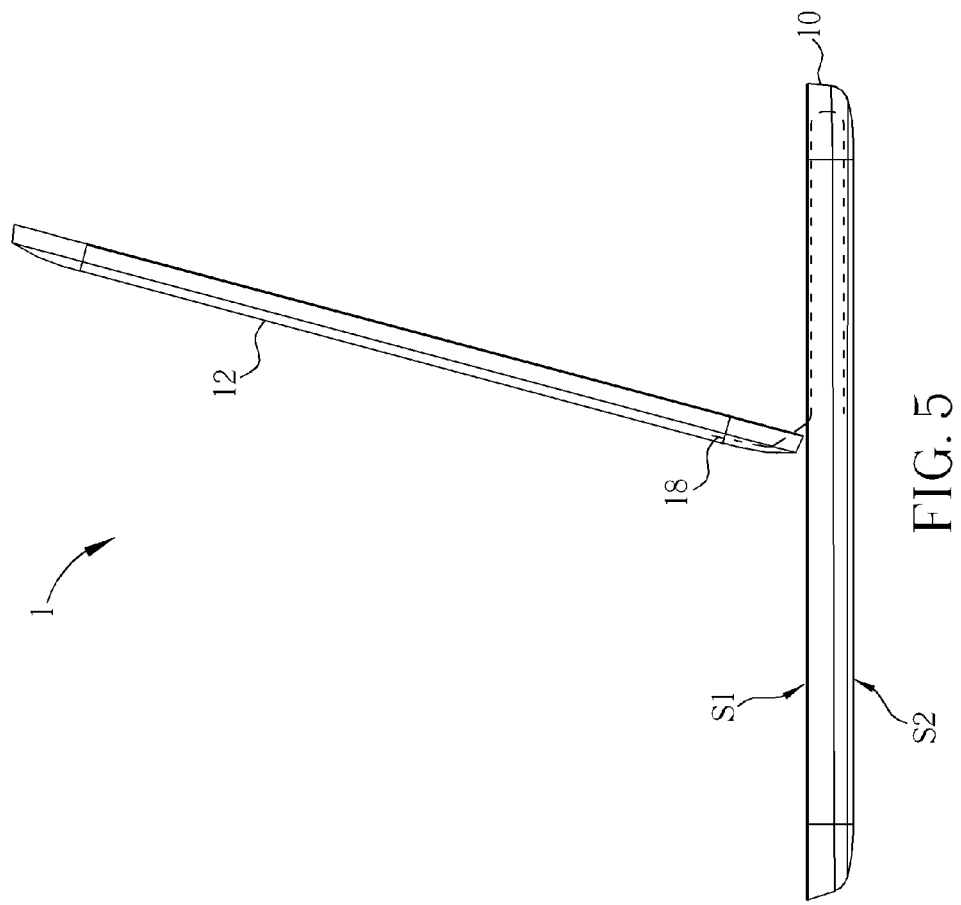
FIG. 5 is a side view illustrating the cover located at an inclined position with respect to the base shown in FIG. 1.
Figure 6:
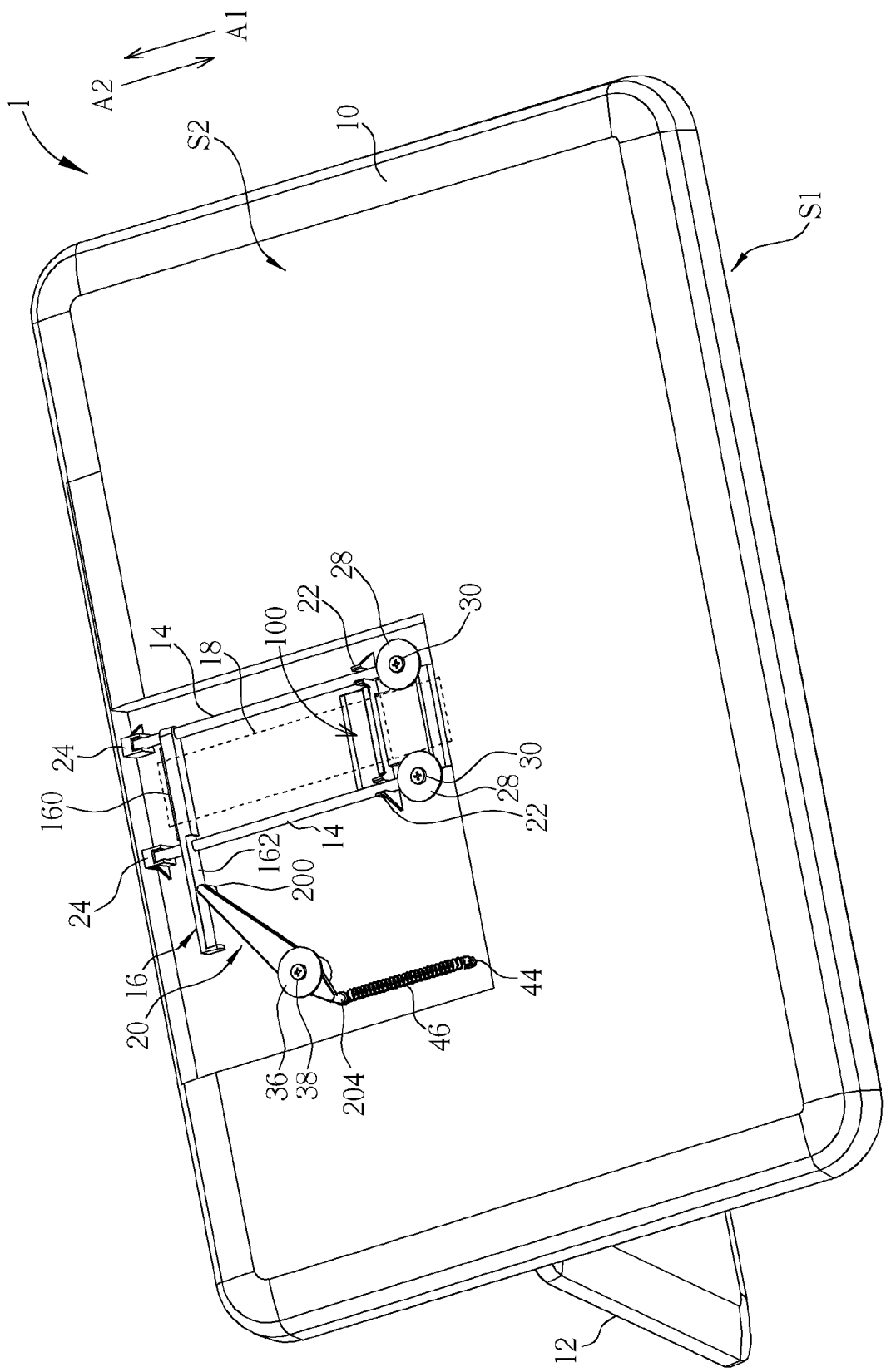
FIG. 6 is a rear perspective view illustrating the electronic device shown in FIG. 5.
Figure 7:
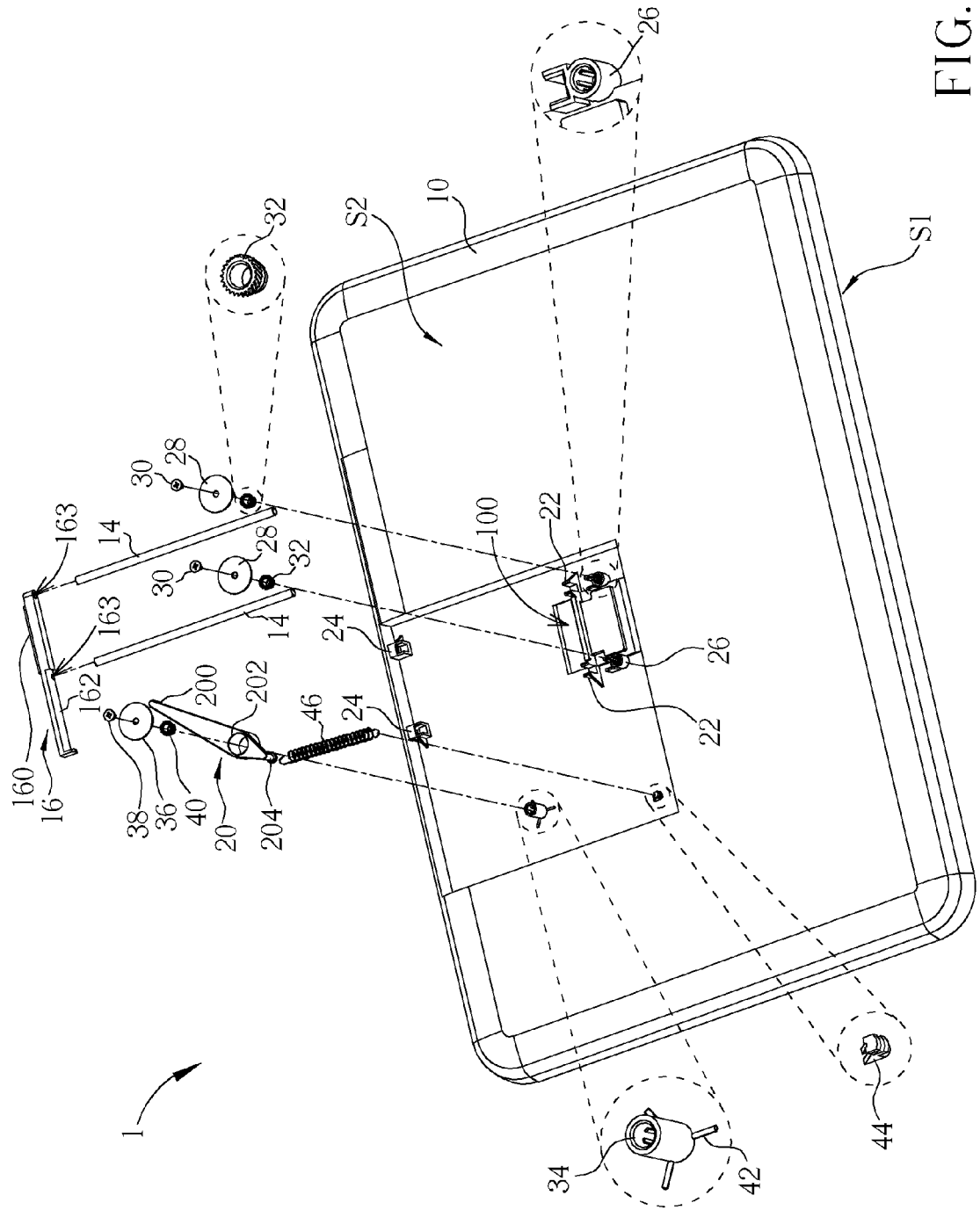
FIG. 7 is an exploded view illustrating the electronic device shown in FIG. 1.

As shown in FIGS. 1 to 7, FIG. 1 is a side view illustrating an electronic device 1 with a guiding mechanism for guiding a flexible printed circuit board according to a first embodiment of the invention, wherein the cover 12 is located at a close position with respect to the base 10; FIG. 2 is a rear perspective view illustrating the electronic device 1 shown in FIG. 1; FIG. 3 is a side view illustrating the cover 12 located at an open position with respect to the base 10 shown in FIG. 1; FIG. 4 is a rear perspective view illustrating the electronic device 1 shown in FIG. 3; FIG. 5 is a side view illustrating the cover 12 located at an inclined position with respect to the base 10 shown in FIG. 1; FIG. 6 is a rear perspective view illustrating the electronic device 1 shown in FIG. 5; and FIG. 7 is an exploded view illustrating the electronic device 1 shown in FIG. 1.

As shown in FIGS. 1 to 7, the electronic device 1 comprises a base 10, a cover 12, two guiding members 14, a pushing member 16, a flexible printed circuit board (FPC) 18 and a rotating member 20. The electronic device 1 may be a sliding-type flat computer, a sliding-type mobile phone or other sliding-type electronic devices. The cover 12 may be, but not limited to, a display device such as a liquid crystal display (LCD) device. A through hole 100 is formed on the base 10. The base 10 has a first side S1 and a second side S2 opposite to the first side Si. The cover 12 is movably disposed on the first side S1 of the base 10. In practical applications, a sliding mechanism may be disposed between the cover 12 and the base 10 such that the cover 12 can move with respect to the base 10. The two guiding members 14 are disposed on the second side S2 of the base 10 in parallel and the through hole 100 is between the two guiding members 14. The pushing member 16 is slidably disposed on the two guiding members 14. In this embodiment, two sliding holes 163 are formed on an end and a central portion of the pushing member 16 respectively. The two guiding members 14 pass through the two sliding holes 163 respectively such that the pushing member 16 is slidably disposed on the two guiding members 14. The pushing member 16 has a guiding surface 160. An end of the FPC 18 is connected to the cover 12 and an other end of the FPC 18 passes through the through hole 100 and surrounds the guiding surface 160 of the pushing member 16 so as to be connected to the base 10. For illustration purpose, the FPC 18 is represented by broken line in FIGS. 1 to 6. In practical applications, the FPC 18 is connected to a main circuit board (not shown) in the base 10. The rotating member 20 is rotatably disposed on the second side S2 of the base 10 and has a pushing portion 200 abutting against a pushing surface 162 of the pushing member 16. In practical applications, the guiding surface 160 and the pushing surface 162 of the pushing member 16 may be flat or uneven.

In this embodiment, the electronic device 1 may further comprise two first fixing sockets 22, two second fixing sockets 24, two fixing pillars 26, two washers 28, two fixing members 30 and two nuts 32. The two first fixing sockets 22 are disposed close to the through hole 100 and the two second fixing sockets 24 are disposed away from the through hole 100. An end of each of the two guiding members 14 is disposed in the first fixing socket 22 correspondingly, and an other end of each of the two guiding members 14 is disposed in the second fixing socket 24 correspondingly. The two fixing pillars 26 are disposed close to the two first fixing sockets 22, the two washers 28 are disposed on the two fixing pillars 26, and the two nuts 32 are disposed in the two fixing pillars 26.

Before assembling the two guiding members 14 and the pushing member 16 to the base 10, the two nuts 32 are hot-melted into the two fixing pillars 26 first. Afterward, the two guiding members 14 pass through the two sliding holes 163 of the pushing member 16 respectively, an end of each of the two guiding members 14 is assembled to the second fixing socket 24 in tight fitting, and an other end of each of the two guiding members 14 is pressed into the first fixing socket 22 correspondingly. Afterward, the fixing member 30 (e.g. screw) passes through the washer 28 and then is fixed in the nut 32 of the fixing pillar 26 such that the washer 28 compresses the guiding member 14, so as to prevent the guiding member 14 from rising upwardly. It should be noted that if the fixing member 30 is a self-tapping screw, it is unnecessary to dispose the nut 32 in the fixing pillar 26.

In this embodiment, the electronic device 1 may further comprise a fixing pillar 34, a washer 36, a fixing member 38, a nut 40, a plurality of protruding portions 42, a fixing socket 44 and a tensile spring 46. The fixing pillar 34 and the fixing socket 44 are disposed on the second side S2 of the base 10. A rotating hole 202 is formed on the rotating member 20. The rotating member 20 further has a fixing portion 204. The protruding portions 42 are disposed around the fixing pillar 34.

Before assembling the rotating member 20 and the tensile spring 46 to the base 10, the nut 40 is hot-melted into the fixing pillar 34 first. Afterward, the fixing pillar 34 passes through the rotating hole 202 of the rotating member 20, the washer 36 is disposed on the rotating hole 202, and the fixing member 38 (e.g. screw) passes through the washer 36 and then is fixed in the nut 40 of the fixing pillar 34 such that the rotating member 20 is rotatably disposed on the second side S2 of the base 10. At this time, the pushing portion 200 of the rotating member 20 has to press the pushing member 16 from forward to backward, as shown in FIG. 4. Afterward, an end of the tensile spring 46 is fixed on the fixing socket 44 and an other end of the tensile spring 46 is fixed on the fixing portion 204 of the rotating member 20. At this time, the tensile spring 46 is under a slightly tensile state as shown in FIG. 4. That is to say, the tensile spring 46 still has tensile strength so as to ensure that the pushing member 16 can be driven back to the end. The protruding portions 42 are used for cooperating with the washer 36 to limit the height of the rotating member 20. Since the rotating member 20 is disposed on the protruding portions 42, the protruding portions 42 can reduce friction between the rotating member 20 and the base 10. The number of the protruding portions 42 can be determined based on practical applications and a surface of each of the protruding portions 42 maybe flat or uneven. It should be noted that if the fixing member 38 is a self-tapping screw, it is unnecessary to dispose the nut 40 in the fixing pillar 34.

When the cover 12 is located at a close position with respect to the base 10 (as shown in FIG. 1), the tensile spring 46 is under a fully tensile state (as shown in FIG. 2). When the cover 12 moves with respect to the base 10 from the close position (as shown in FIG. 1) to an open position (as shown in FIG. 3), the tensile spring 46, which is under the fully tensile state, is released to drive the rotating member 20 to rotate with respect to the base 10 such that the pushing portion 200 pushes the pushing member 16 to slide along the two guiding members 14 in a direction indicated by an arrow A1 shown in FIG. 4, so as to drive the FPC 18 to move. When the cover 12 is located at the open position with respect to the base 10 (as shown in FIG. 3), the tensile spring 46 is under a slightly tensile state (as shown in FIG. 4). Afterward, when the cover 12 rotates with respect to the base 10 from the open position (as shown in FIG. 3) to an inclined position (as shown in FIG. 5), the FPC 18 drives the pushing member 16 to slide along the two guiding members 14 in a direction indicated by an arrow A2 shown in FIG. 6, so as to drive the rotating member 20 to rotate. When the cover 12 is located at the inclined position with respect to the base 10 (as shown in FIG. 5), the tensile spring 46 is under a slightly tensile state (as shown in FIG. 6).

When the cover 12 rotates with respect to the base 10 from the inclined position (as shown in FIG. 5) to the open position (as shown in FIG. 3), the tensile spring 46, which is under a slightly tensile state, is released to drive the rotating member 20 to rotate with respect to the base 10 such that the pushing portion 200 pushes the pushing member 16 to slide along the two guiding members 14 in a direction indicated by the arrow A1 shown in FIG. 6, so as to drive the FPC 18 to move. Afterward, when the cover 12 moves with respect to the base 10 from the open position (as shown in FIG. 3) to the close position (as shown in FIG. 1), the FPC 18 drives the pushing member 16 to slide along the two guiding members 14 in a direction indicated by the arrow A2 shown in FIG. 4, so as to drive the rotating member 20 to rotate.

Therefore, when the cover 12 moves with respect to the base 10 between the close position and the open position or rotates with respect to the base 10 between the open position and the inclined position, the guiding mechanism, which essentially consists of the guiding members 14, the pushing member 16, the rotating member 20 and the tensile spring 46, can guide the FPC 18 to move along a direction defined by the guiding members 14. Accordingly, the invention can prevent the FPC 18 from cracking effectively while the FPC 18 moves or rotates again and again.

Figure 8:
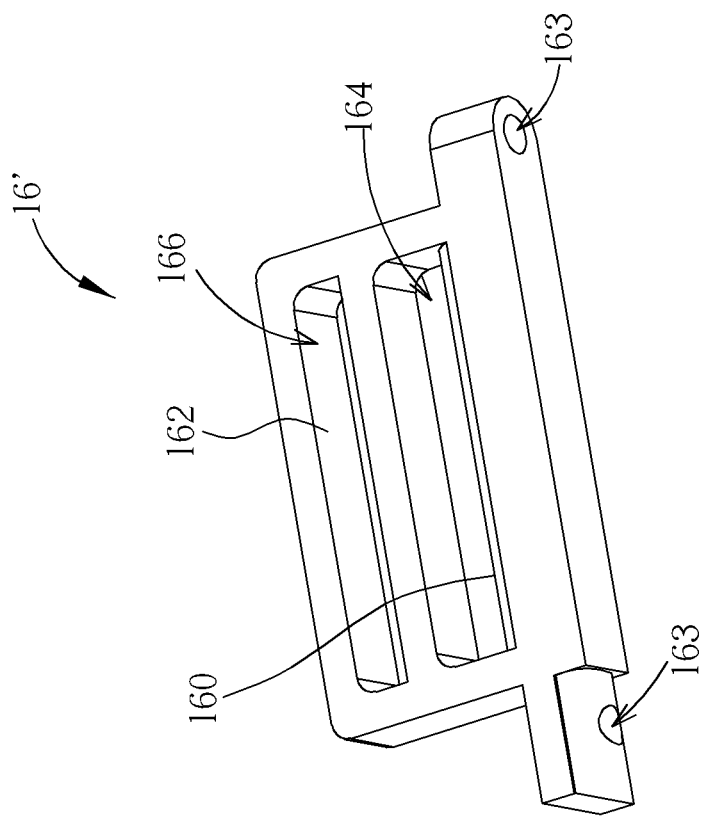
FIG. 8 is a perspective view illustrating a pushing member according to a second embodiment of the invention.
Figure 9:
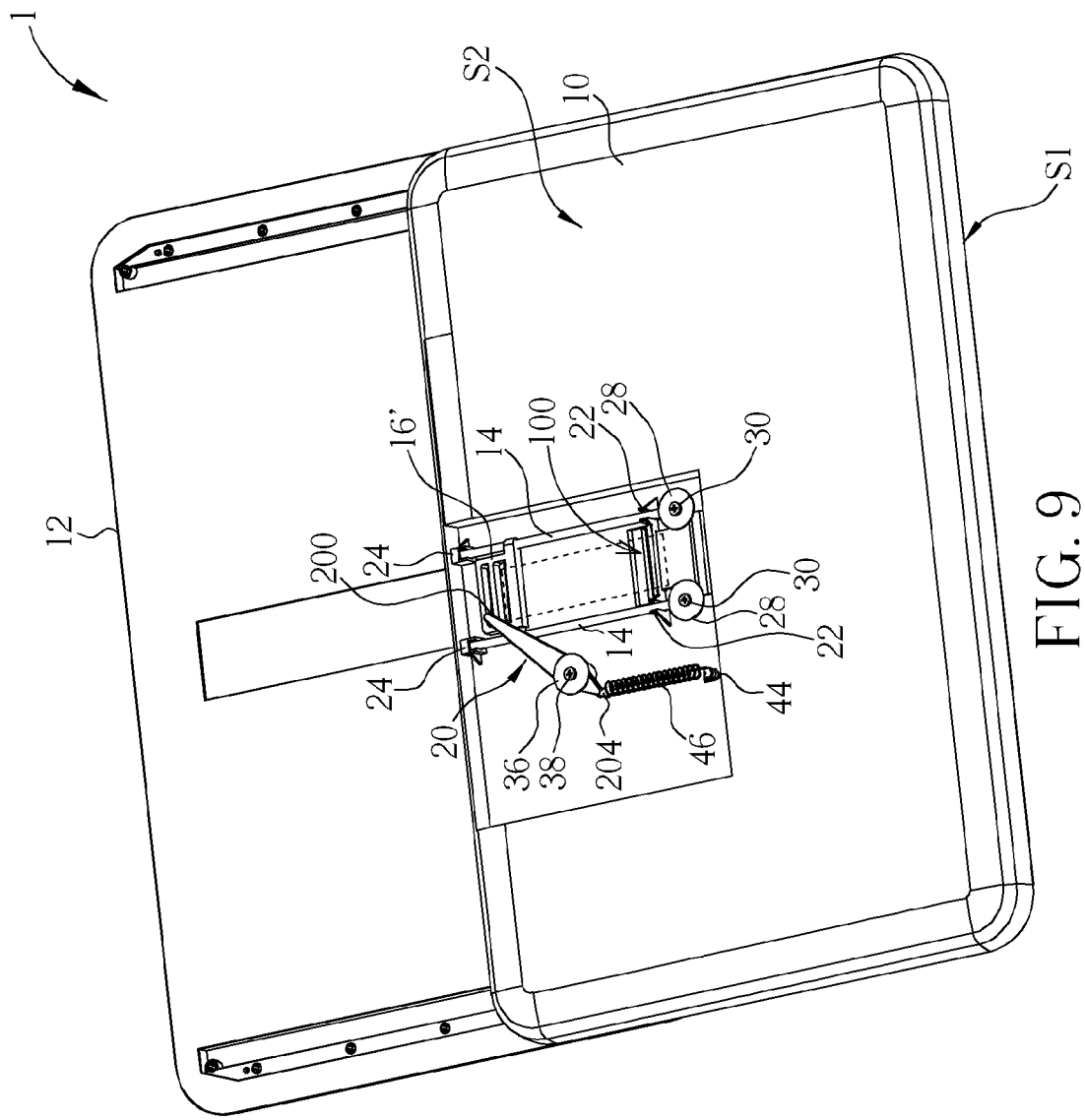
FIG. 9 is a rear perspective view illustrating the pushing member shown in FIG. 4 being replaced by the pushing member shown in FIG. 8.

Referring to FIGS. 8 and 9, FIG. 8 is a perspective view illustrating a pushing member 16' according to a second embodiment of the invention, and FIG. 9 is a rear perspective view illustrating the pushing member 16 shown in FIG. 4 being replaced by the pushing member 16' shown in FIG. 8. The main difference between the pushing member 16' and the aforesaid pushing member 16 is that the pushing member 16' has two recesses 164, 166, wherein the recess 166 is located above the recess 164, a side surface of the recess 164 is served as the guiding surface 160, and a side surface of the recess 166 is served as the pushing surface 162, as shown in FIG. 8. After replacing the pushing member 16 shown in FIG. 4 by the pushing member 16' shown in FIG. 8, an end of the FPC 18 passes through the recess 164 and surrounds the guiding surface 160 so as to be connected to the base 10, and the pushing portion 200 of the rotating member 20 is located in the recess 166 and abuts against the pushing surface 162. Accordingly, the rotating member 20 and the tensile spring 46 can be disposed inward so as to reduce the size of the guiding mechanism. Furthermore, in this embodiment, two sliding holes 163 are formed on both ends of the pushing member 16' and the two guiding members 14 pass through the two sliding holes 163 respectively such that the pushing member 16' is slidably disposed on the two guiding members 14.

Figure 10:
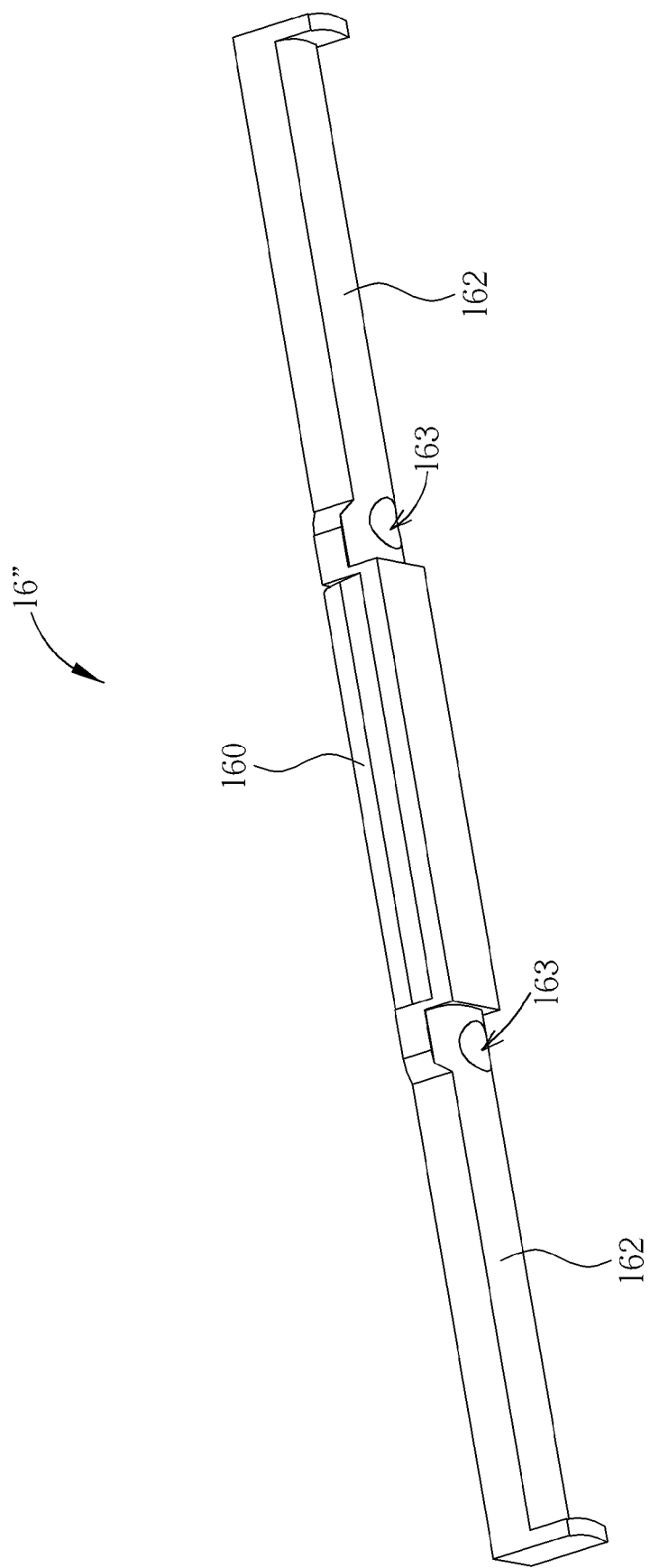
FIG. 10 is a perspective view illustrating a pushing member according to a third embodiment of the invention.

Referring to FIG. 10, FIG. 10 is a perspective view illustrating a pushing member 16" according to a third embodiment of the invention. The main difference between the pushing member 16" and the aforesaid pushing member 16 is that there are two pushing surfaces 162 on both ends of the pushing member 16". Therefore, after replacing the pushing member 16 shown in FIG. 4 by the pushing member 16" shown in FIG. 10, two sets of rotating members 20 and tensile springs 46 may be disposed on opposite sides of the pushing member 16" so as to increase force for pushing the FPC 18 while the cover 12 moves with respect to the base 10 between the close position and the open position or rotates with respect to the base 10 between the open position and the inclined position. Moreover, in this embodiment, two sliding holes 163 are formed on two central portions of the pushing member 16" and the aforesaid two guiding members 14 pass through the two sliding holes 163 such that the pushing member 16" is slidably disposed on the two guiding members 14.

Figure 11:
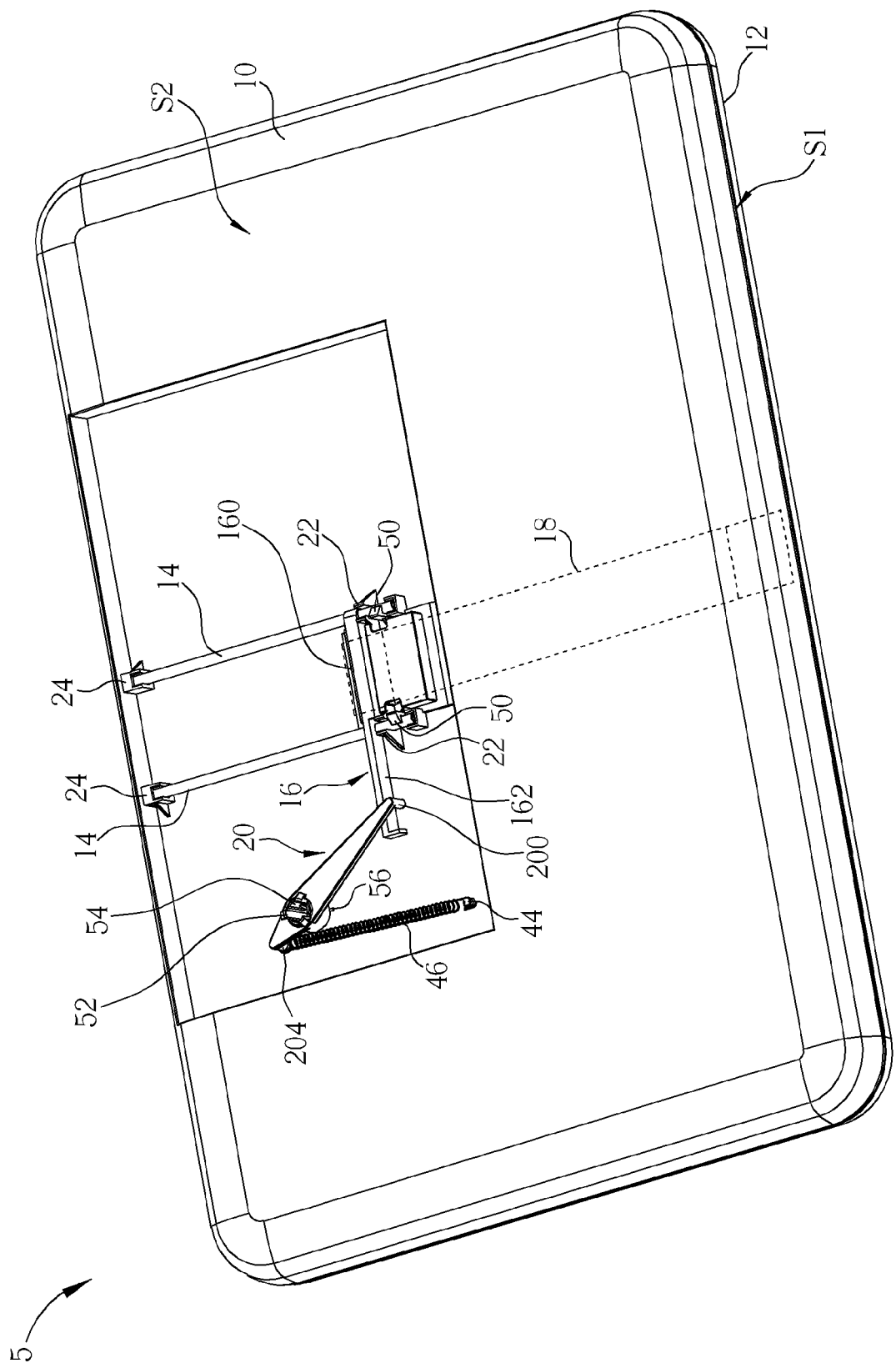
FIG. 11 is a rear perspective view illustrating an electronic device with a guiding mechanism for guiding an FPC according to a fourth embodiment of the invention, wherein the cover is located at a close position with respect to the base.
Figure 12:
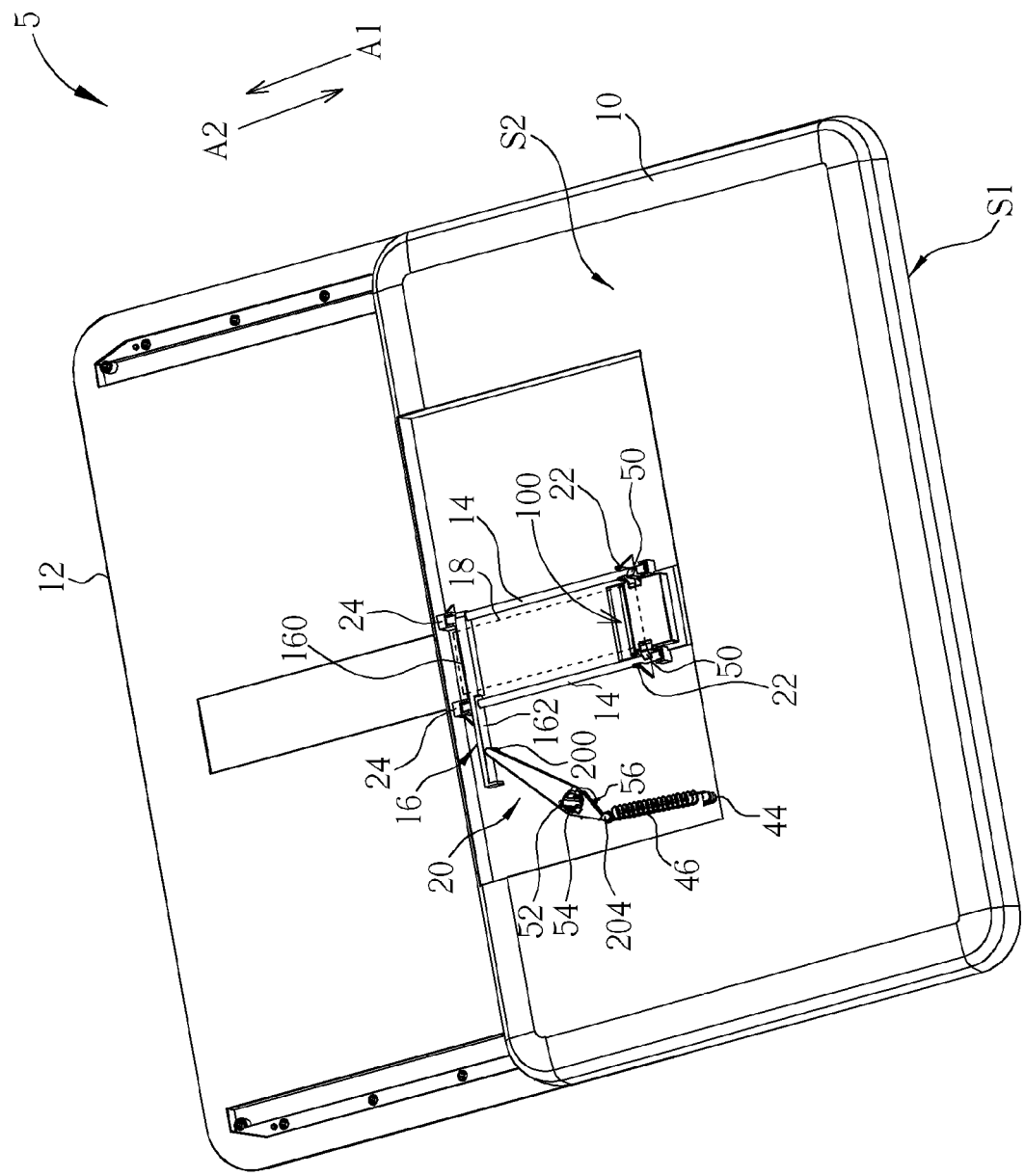
FIG. 12 is a rear perspective view illustrating the cover located at an open position with respect to the base shown in FIG. 11.
Figure 13:
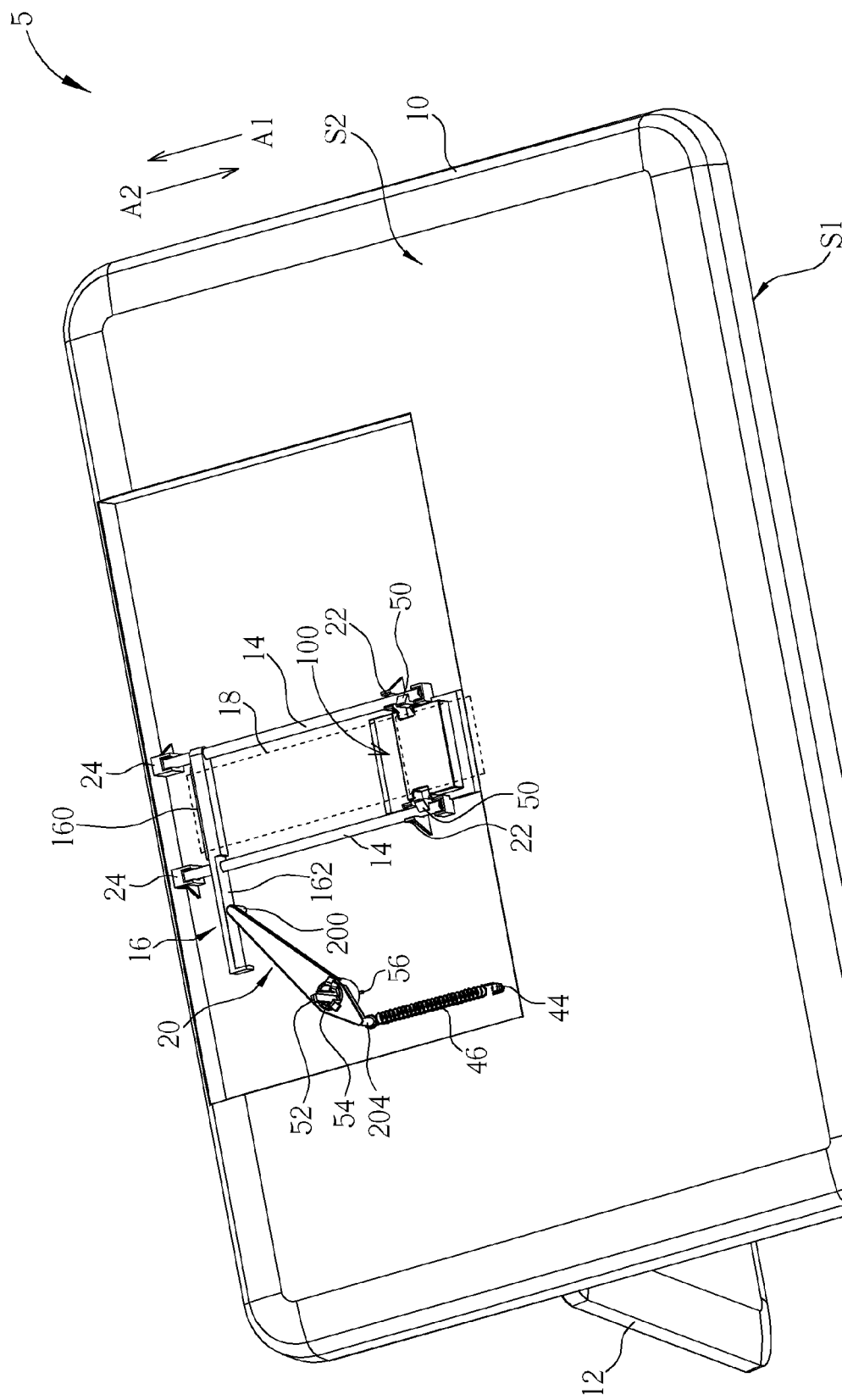
FIG. 13 is a rear perspective view illustrating the cover located at an inclined position with respect to the base shown in FIG. 11.
Figure 14:
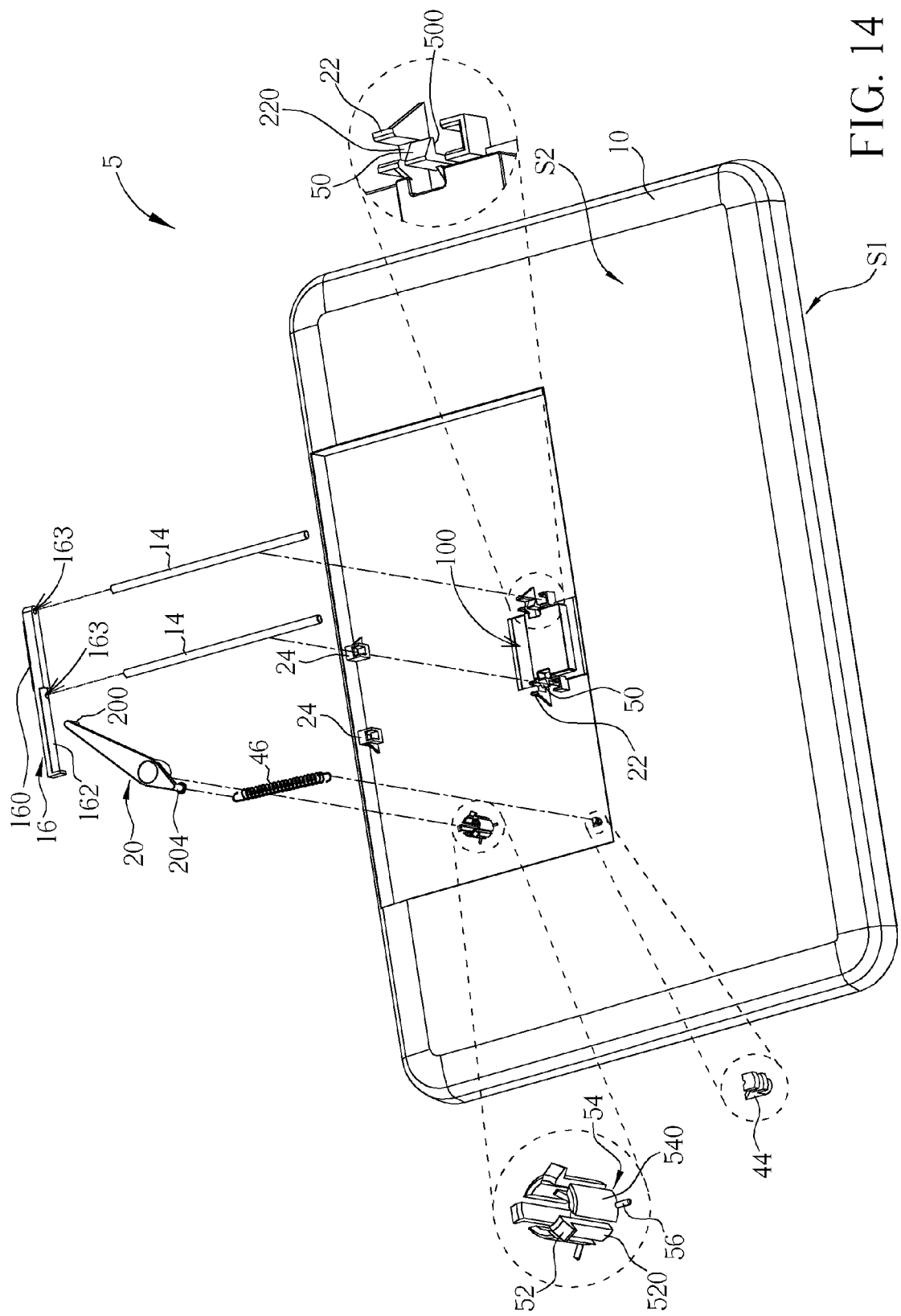
FIG. 14 is an exploded view illustrating the electronic device shown in FIG. 11.

Referring to FIGS. 11 to 14, FIG. 11 is a rear perspective view illustrating an electronic device 5 with a guiding mechanism for guiding an FPC according to a fourth embodiment of the invention, wherein the cover 12 is located at a close position with respect to the base 10; FIG. 12 is a rear perspective view illustrating the cover 12 located at an open position with respect to the base 10 shown in FIG. 11; FIG. 13 is a rear perspective view illustrating the cover 12 located at an inclined position with respect to the base 10 shown in FIG. 11; and FIG. 14 is an exploded view illustrating the electronic device 5 shown in FIG. 11. FIGS. 1, 3 and 5 are also side views of FIG. 11 to FIG. 13 respectively. It should be noted that the same elements in FIGS. 11 to 14 and FIGS. 2, 4, 6 and 7 are represented by the same numerals, so the repeated explanation will not be depicted herein again.

In this embodiment, the electronic device 5 may further comprise two hooks 50 disposed close to the two first fixing sockets 22. When assembling the two guiding members 14 and the pushing member 16 to the base 10, the two guiding members 14 pass through the two sliding holes 163 of the pushing member 16 respectively such that the pushing member 16 is slidably disposed on the two guiding member 14. Afterward, an end of each of the two guiding members 14 is assembled to the second fixing socket 24 in tight fitting, and an other end of each of the two guiding members 14 is pressed into the first fixing socket 22 correspondingly. When an end of each of the two guiding members 14 is disposed in the first fixing socket 22, the hook 50 will engage with the guiding member 14 so as to prevent the guiding member from rising. In this embodiment, a vertical distance between a lower surface 500 of the hook 50 and an upper surface 220 of the first fixing socket 22 may be slightly smaller than a diameter of the guiding member 14 such that the guiding member 14 is engaged between the hook 50 and the first fixing socket 22 in tight fitting.

In this embodiment, the electronic device 5 may further comprise a plurality of hooks 52, a plurality of retaining walls 54 and a plurality of protruding portions 56. The hooks 52 and the retaining walls 54 are arranged interlacedly and the protruding portions 56 are disposed around the retaining walls 54. In other words, the protruding portions 56 and the hooks 52 are also arranged interlacedly. When assembling the rotating member 20 and the tensile spring 46 to the base 10, the hooks 52 and the retaining walls 54 pass through the rotating hole 202 of the rotating member 20 first such that the rotating member 20 is rotatably disposed on the second side S2 of the base 10, wherein the retaining walls 54 are used for positioning the rotating member 20 and the hooks 52 are used for engaging with the rotating member 20. At this time, the pushing portion 200 of the rotating member 20 has to press the pushing member 16 from forward to backward, as shown in FIG. 12. Afterward, an end of the tensile spring 46 is fixed on the fixing socket 44 and another end of the tensile spring 46 is fixed on the fixing portion 204 of the rotating member 20. At this time, the tensile spring 46 is under a slightly tensile state as shown in FIG. 12. That is to say, the tensile spring 46 still has tensile strength so as to ensure that the pushing member 16 can be driven back to the end. The protruding portions 56 are used for cooperating with the hooks 52 to limit the height of the rotating member 20. Since the rotating member 20 is disposed on the protruding portions 56, the protruding portions 56 can reduce friction between the rotating member 20 and the base 10. The number of the hooks 52, the retaining walls 54 and the protruding portions 42 can be determined based on practical applications and a surface of each of the protruding portions 56 maybe flat or uneven.

In this embodiment, outer surfaces 520 of the hooks 52 form a first circle and outer surfaces 540 of the retaining walls 54 form a second circle, wherein the first circle and the second circle are concentric circles. Since the retaining walls 54 are used for positioning the rotating member 20 and the hooks 52 are used for engaging with the rotating member 20, a diameter of the first circle is smaller than a diameter of the second circle. That is to say, the outer surfaces 520 of the hooks 52 does not contact an inner surface of the rotating hole 202 of the rotating member 20 so as to reduce friction resistance while the rotating member 20 is rotating.

When the cover 12 moves or rotates with respect to the base 10 between the close position (as shown in FIGS. 1 and 11), the open position (as shown in FIGS. 3 and 12) and the inclined position (as shown in FIGS. 5 and 13), how the guiding members 14, the pushing member 16, the rotating member 20 and the tensile spring 46 cooperate with each other to guide the FPC 18 can be referred to the aforesaid first embodiment and will not be depicted herein again. Furthermore, the pushing member 16 shown in FIGS. 11 to 14 can be also replaced by the pushing member 16' shown in FIG. 8 or the pushing member 16" shown in FIG. 10.

As mentioned in the above, the fourth embodiment mainly replaces screw fixing structure of the first embodiment by hook engaging structure so as to reduce assembly and component cost.

Figure 15:
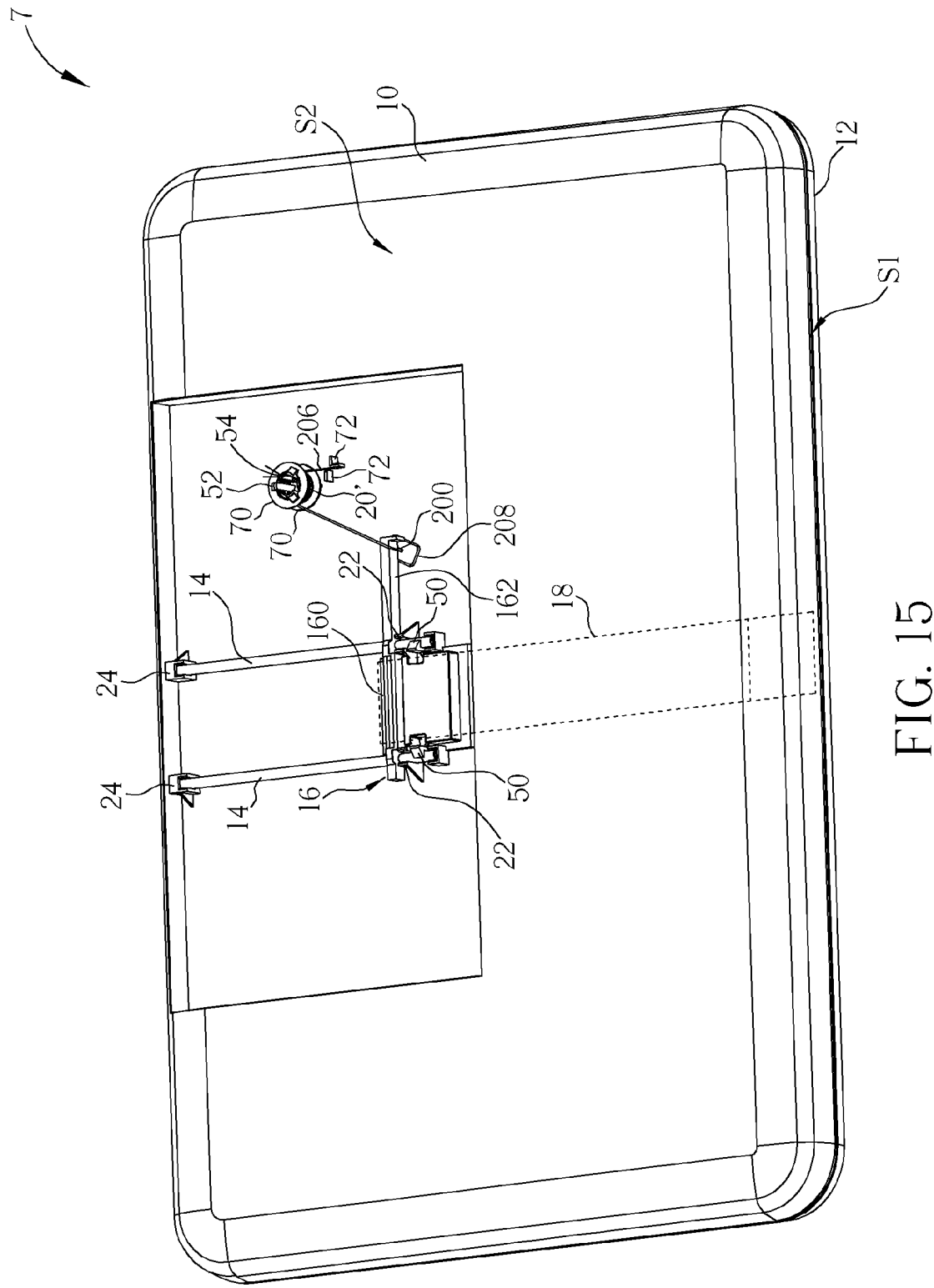
FIG. 15 is a rear perspective view illustrating an electronic device with a guiding mechanism for guiding an FPC according to a fifth embodiment of the invention, wherein the cover is located at a close position with respect to the base.
Figure 16:
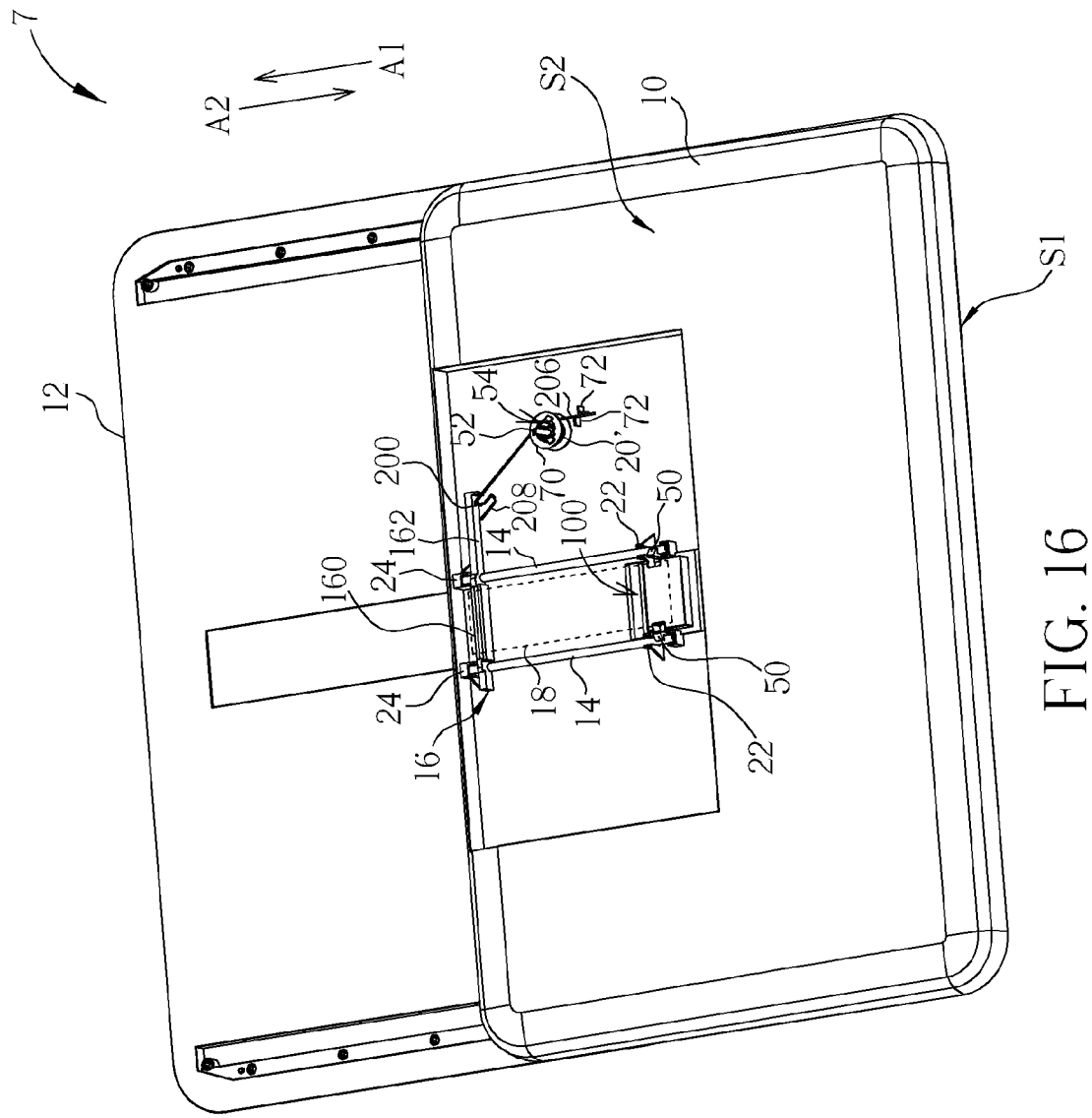
FIG. 16 is a rear perspective view illustrating the cover located at an open position with respect to the base shown in FIG. 15.
Figure 17:
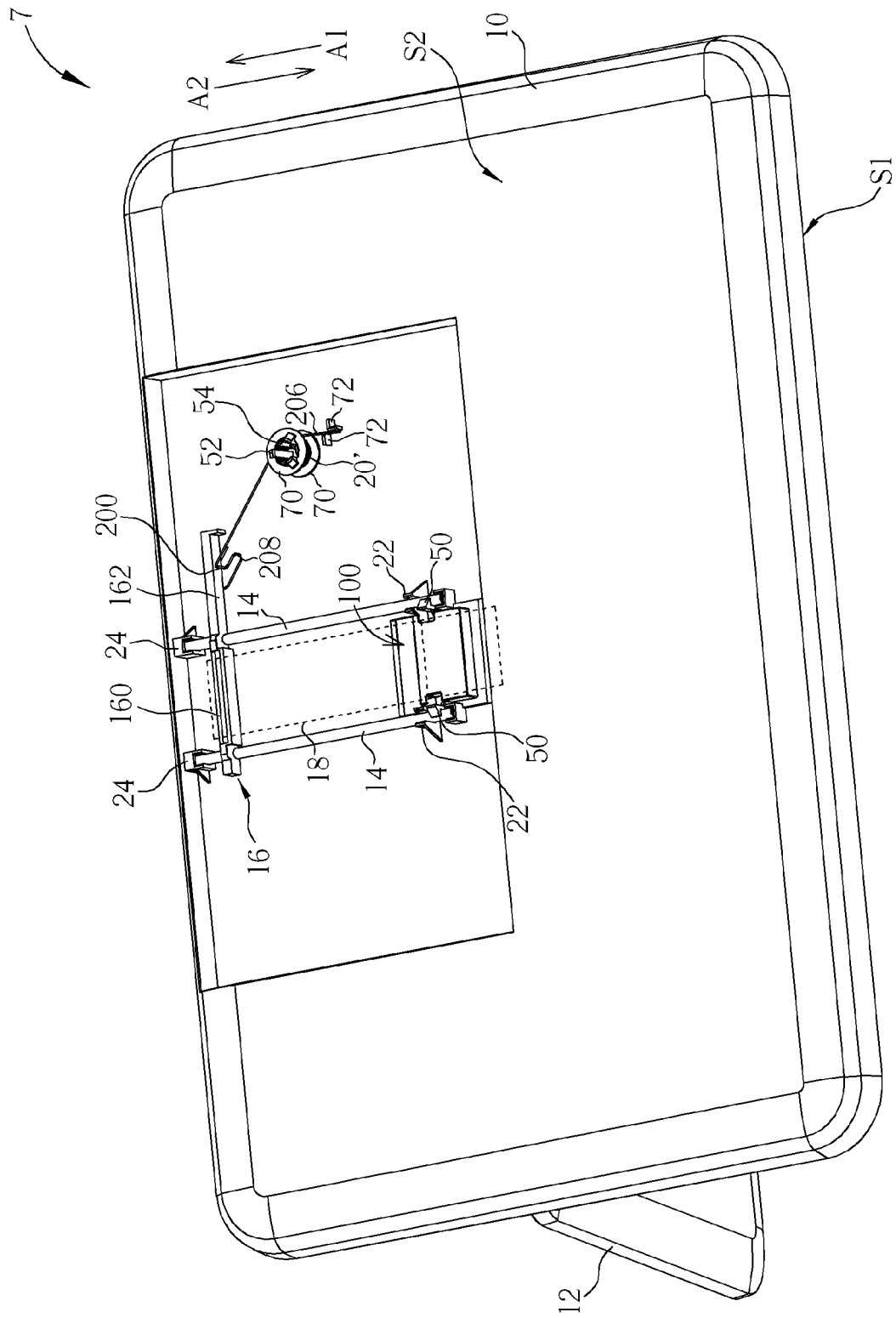
FIG. 17 is a rear perspective view illustrating the cover located at an inclined position with respect to the base shown in FIG. 15.
Figure 18:
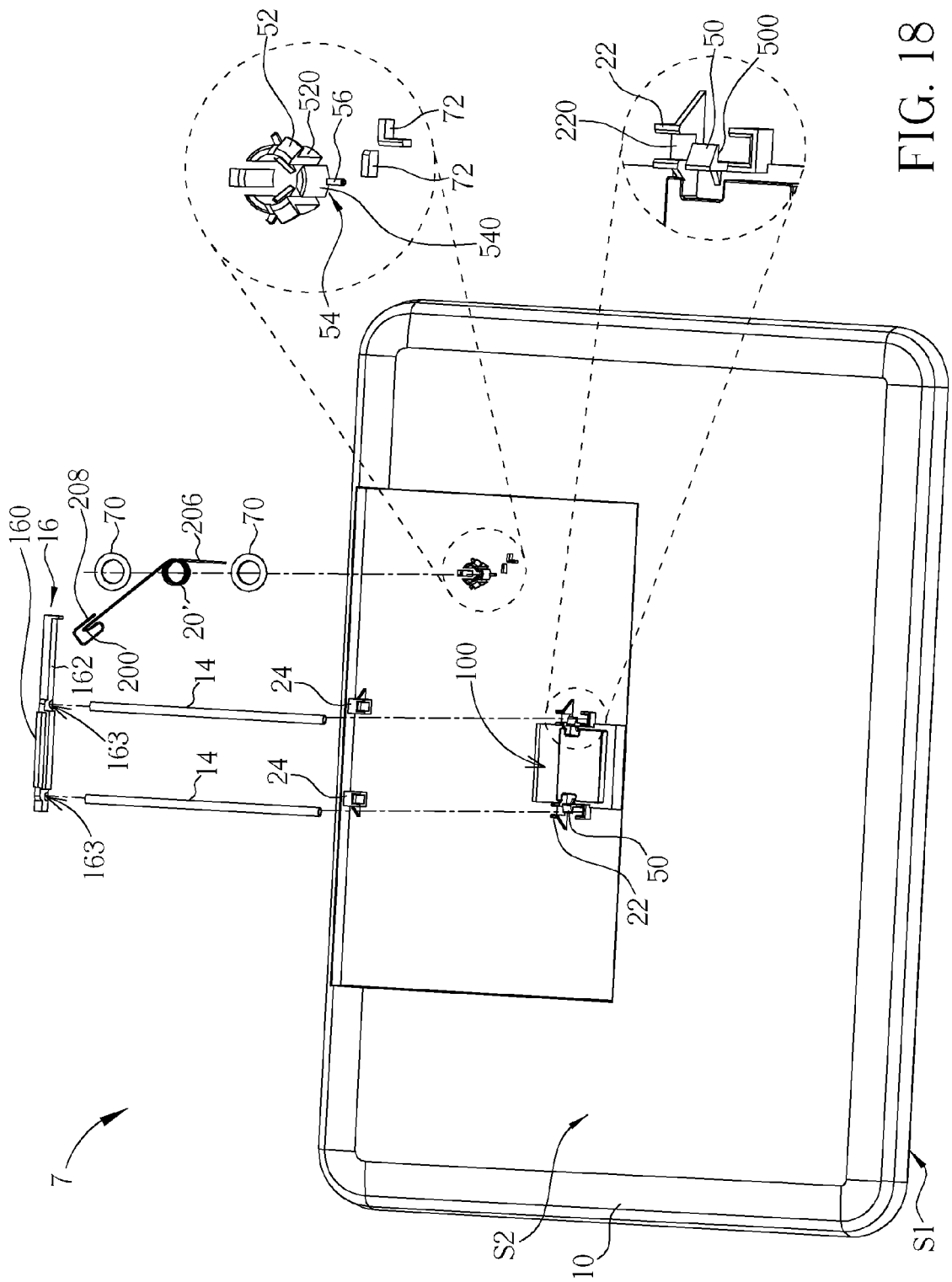
FIG. 18 is an exploded view illustrating the electronic device shown in FIG. 15.

Referring to FIGS. 15 to 18, FIG. 15 is a rear perspective view illustrating an electronic device 7 with a guiding mechanism for guiding an FPC according to a fifth embodiment of the invention, wherein the cover 12 is located at a close position with respect to the base 10; FIG. 16 is a rear perspective view illustrating the cover 12 located at an open position with respect to the base 10 shown in FIG. 15; FIG. 17 is a rear perspective view illustrating the cover 12 located at an inclined position with respect to the base 10 shown in FIG. 15; and FIG. 18 is an exploded view illustrating the electronic device 7 shown in FIG. 15. FIGS. 1, 3 and 5 are also side views of FIG. 15 to FIG. 17 respectively. It should be noted that the same elements in FIGS. 15 to 18 and FIGS. 2, 4, 6, 7, 11 and 14 are represented by the same numerals, so the repeated explanation will not be depicted herein again.

The main difference between the electronic device 7 and the aforesaid electronic device 5 is that a rotating member 20' of the electronic device 7 is a torsion spring. The rotating member 20' further has a restraining portion 206 and a retaining portion 208 except the aforesaid pushing member 200 and rotating hole 202. The retaining portion 208 is extended from the pushing member 200 and disposed below the pushing member 16. The retaining portion 208 is used for hooking the pushing member 16 so as to prevent the pushing portion 200 from coming off the pushing surface 162 of the pushing member 16. Furthermore, the electronic device 7 further comprises two washers 70 and two restraining ribs 72. The two washers 70 are disposed on both sides of the rotating hole 202 of the rotating member 20' respectively. The two restraining ribs 72 are disposed on the second side S2 of the base 10. The restraining portion 206 is fixed between the two restraining ribs 72.

When assembling the rotating member 20' to the base 10, the hooks 52 and the retaining walls 54 pass through one of the washers 70, the rotating hole 202 of the rotating member 20' and the other one of the washers 70 sequentially such that the rotating member 20' is rotatably disposed on the second side S2 of the base 10, wherein the retaining walls 54 are used for positioning the rotating member 20' and the hooks 52 are used for engaging with the rotating member 20'. At the same time, the restraining portion 206 of the rotating member 20' is pressed into between the two restraining ribs 72 and the retaining portion 208 of the rotating member 20' is located below the pushing member 16, as shown in FIG. 16. At this time, the rotating member 20' is under a slightly tensile state as shown in FIG. 16 so as to ensure that the pushing member 16 can be driven back to the end. The protruding portions 56 cooperate with the washers 70 to limit a height of the rotating member 20'. Since the rotating member 20' is disposed between the two washers 70, it can prevent the rotating member 20' from tilting and reduce abrasion of the hooks 52 and the protruding portions 56.

When the cover 12 is located at a close position with respect to the base 10 (as shown in FIG. 1), the rotating member 20' is under a fully torsional state (as shown in FIG. 15). When the cover 12 moves with respect to the base 10 from the close position (as shown in FIG. 1) to an open position (as shown in FIG. 3), the pushing portion 200 of the rotating member 20', which is under the fully torsional state, is released to rotate with respect to the base 10 such that the pushing portion 200 pushes the pushing member 16 to slide along the two guiding members 14 in a direction indicated by an arrow A1 shown in FIG. 16, so as to drive the FPC 18 to move. When the cover 12 is located at the open position with respect to the base 10 (as shown in FIG. 3), the rotating member 20' is under a slightly torsional state (as shown in FIG. 16). Afterward, when the cover 12 rotates with respect to the base 10 from the open position (as shown in FIG. 3) to an inclined position (as shown in FIG. 5), the FPC 18 drives the pushing member 16 to slide along the two guiding members 14 in a direction indicated by an arrow A2 shown in FIG. 17, so as to drive the pushing portion 200 of the rotating member 20' to rotate. When the cover 12 is located at the inclined position with respect to the base 10 (as shown in FIG. 5), the rotating member 20' is under a slightly torsional state (as shown in FIG. 17).

When the cover 12 rotates with respect to the base 10 from the inclined position (as shown in FIG. 5) to the open position (as shown in FIG. 3), the pushing portion 200 of the rotating member 20', which is under a slightly torsional state, is released to rotate with respect to the base 10 such that the pushing portion 200 pushes the pushing member 16 to slide along the two guiding members 14 in a direction indicated by the arrow A1 shown in FIG. 17, so as to drive the FPC 18 to move. Afterward, when the cover 12 moves with respect to the base 10 from the open position (as shown in FIG. 3) to the close position (as shown in FIG. 1), the FPC 18 drives the pushing member 16 to slide along the two guiding members 14 in a direction indicated by the arrow A2 shown in FIG. 16, so as to drive the pushing portion 200 of the rotating member 20' to rotate.

As mentioned in the above, the fifth embodiment mainly replaces the rotating member 20 and the tensile spring 46 of the first and fourth embodiments by the torsion spring so as to reduce assembly and component cost. Furthermore, the pushing member 16 shown in FIGS. 15 to 18 can be also replaced by the pushing member 16' shown in FIG. 8 or the pushing member 16" shown in FIG. 10.

As mentioned in the above, when the cover moves with respect to the base between the close position and the open position or rotates with respect to the base between the open position and the inclined position, the invention utilizes a guiding mechanism, which essentially consists of the guiding members, the pushing member and the rotating member, to guide the FPC to move along a direction defined by the guiding members. Accordingly, the invention can prevent the FPC from cracking effectively while the FPC moves or rotates again and again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device comprising:
a base, a through hole being formed on the base, the base having a first side and a second side opposite to the first side;
a cover movably disposed on the first side of the base;
two guiding members disposed on the second side of the base in parallel, the through hole being between the two guiding members;
a pushing member slidably disposed on the two guiding members and having a guiding surface;
a flexible printed circuit board, an end of the flexible printed circuit board being connected to the cover, an other end of the flexible printed circuit board passing through the through hole and surrounding the guiding surface of the pushing member so as to be connected to the base; and
a rotating member rotatably disposed on the second side of the base and having a pushing portion abutting against the pushing member;
wherein when the cover moves with respect to the base from a close position to an open position, the rotating member rotates with respect to the base such that the pushing portion pushes the pushing member to slide along the two guiding members so as to drive the flexible printed circuit board to move; when the cover moves with respect to the base from the open position to the close position, the flexible printed circuit board drives the pushing member to slide along the two guiding members so as to drive the rotating member to rotate.

2. The electronic device of claim 1, wherein when the cover rotates with respect to the base from the open position to an inclined position, the flexible printed circuit board drives the pushing member to slide along the two guiding members so as to drive the rotating member to rotate; when the cover rotates with respect to the base from the inclined position to the open position, the rotating member rotates with respect to the base such that the pushing portion pushes the pushing member to slide along the two guiding members so as to drive the flexible printed circuit board to move.

3. The electronic device of claim 1 further comprising two first fixing sockets and two second fixing sockets, the two first fixing sockets being disposed close to the through hole, the two second fixing sockets being disposed away from the through hole, an end of each of the two guiding members being disposed in the first fixing socket correspondingly, and an other end of each of the two guiding members being disposed in the second fixing socket correspondingly.

4. The electronic device of claim 3 further comprising two fixing pillars, two washers and two fixing members, the two fixing pillars being disposed close to the two first fixing sockets, the two washers being disposed on the two fixing pillars, the two fixing members passing through the two washers and then being fixed on the two fixing pillars such that the two washers compress the two guiding members.

5. The electronic device of claim 3 further comprising two hooks disposed close to the two first fixing sockets, when an end of each of the two guiding members is disposed in the first fixing socket correspondingly, the hook engaging with the guiding member correspondingly.

6. The electronic device of claim 1 further comprising a fixing pillar, a washer and a fixing member, the fixing pillar being disposed on the second side of the base, a rotating hole being formed on the rotating member, the fixing pillar passing through the rotating hole, the washer being disposed on the rotating hole, the fixing member passing through the washer and the rotating hole and then being fixed on the fixing pillar such that the rotating member is rotatably disposed on the second side of the base.

7. The electronic device of claim 6 further comprising a plurality of protruding portions disposed around the fixing pillar and used for cooperating with the washer to limit a height of the rotating member.

8. The electronic device of claim 6 further comprising a fixing socket and a tensile spring, the fixing socket being disposed on the second side of the base, the rotating member further having a fixing portion, an end of the tensile spring being fixed on the fixing socket and an other end of the tensile spring being fixed on the fixing portion of the rotating member.

9. The electronic device of claim 1 further comprising a plurality of hooks and a plurality of retaining walls, the hooks and the retaining walls being arranged interlacedly, a rotating hole being formed on the rotating member, the hooks and the retaining walls passing through the rotating hole such that the rotating member is rotatably disposed on the second side of the base, the retaining walls being used for positioning the rotating member, the hooks being used for engaging with the rotating member.

10. The electronic device of claim 9 further comprising a plurality of protruding portions disposed around the retaining walls and used for cooperating with the hooks to limit a height of the rotating member.

11. The electronic device of claim 9, wherein outer surfaces of the hooks form a first circle, outer surfaces of the retaining walls form a second circle, the first circle and the second circle are concentric circles, and a diameter of the first circle is smaller than a diameter of the second circle.

12. The electronic device of claim 9 further comprising a fixing socket and a tensile spring, the fixing socket being disposed on the second side of the base, the rotating member further having a fixing portion, an end of the tensile spring being fixed on the fixing socket and an other end of the tensile spring being fixed on the fixing portion of the rotating member.

13. The electronic device of claim 9 further comprising two washers disposed on both sides of the rotating hole of the rotating member respectively.

14. The electronic device of claim 13 further comprising two restraining ribs disposed on the second side of the base, the rotating member is a torsion spring, the rotating member having a restraining portion fixed between the two restraining ribs.

15. The electronic device of claim 14, wherein the rotating member further has a retaining portion extended from the pushing portion and disposed below the pushing member.

16. The electronic device of claim 1, wherein two sliding holes are formed on an end and a central portion of the pushing member respectively, the two guiding members pass through the two sliding holes respectively such that the pushing member is slidably disposed on the two guiding members.

17. The electronic device of claim 1, wherein two sliding holes are formed on both ends of the pushing member respectively, the two guiding members pass through the two sliding holes respectively such that the pushing member is slidably disposed on the two guiding members.

18. The electronic device of claim 1, wherein two sliding holes are formed on two central portions of the pushing member respectively, the two guiding members pass through the two sliding holes respectively such that the pushing member is slidably disposed on the two guiding members.

* * * * *